H. B. HAMMON.
Ox-Yoke.
No. 10,918.  Patented May 16, 1854.
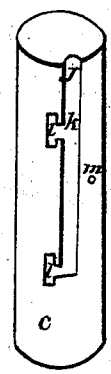
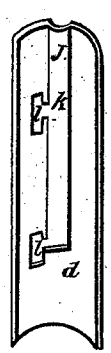
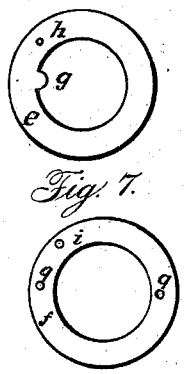
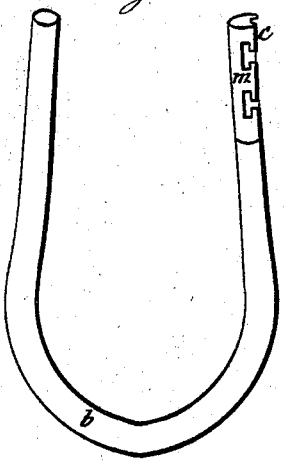
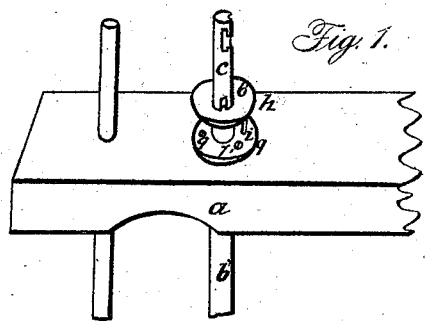
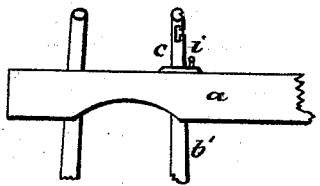
Witnesses:
Inventor:

UNITED STATES PATENT OFFICE.

HEMAN B. HAMMON, OF BRISTOLVILLE, OHIO.

OX-YOKE.

Specification of Letters Patent No. 10,918, dated May 16, 1854.

*To all whom it may concern:*

Be it known that I, HEMAN BANGS HAMMON, of Bristolville, in the county of Trumbull and State of Ohio, have invented a new and Improved Mode of Securing Bows in Ox-Yokes; and I do hereby declare that the following is a full and exact description thereof, reference being had to the accompanying drawings and letters of reference marked thereon.

The nature of my invention consists in securing over the end of the bow a ferrule "c," Figure 3, and securing the bow in the yoke beam "a," Fig. 2, with the washers "e and f," Figs. 6 and 7.

To enable others skilled in the art, to make and use my invention, I will proceed to describe its construction and operation. "a, a," is one half of the yoke beam, made in the usual manner, showing the bow "b'" secured in the yoke beam by the ferrule "c" and the washers "e and f."

"c" is a view of the ferrule before it is secured to the bow.

"d," Fig. 4, is a longitudinal sectional view of the ferrule.

"k" is a groove to receive the projection "g" of washer "e."

"j" is a concave in the upper end of the groove, from three eighths to one inch in length, to prevent the top of the ferrule from spreading apart when the ferrule is on the bow.

"l, l" are apertures, two or more, to receive the projection "g" after it has passed down the groove "k." The apertures "l l" and projection "g" are to hold the bow in the yoke-beam, as at "a," Fig. 2. My object of having one, two, or more apertures in the ferrule is to suit the bow to any size neck.

"e and f" are views of the washers. "h" is a hole through the washer to receive the pin "i." The pin "i" and hole "h" is to prevent the washer "e" from being disconnected from the ferrule "c" if by accident the bow should be raised up through the yoke beam, as shown in Fig. 1, and the washer "e" should be raised out of the lower part of the aperture "l," as shown in Fig. 1.

"9, 9" are screws to firmly secure the washer "f" to the top side of the yoke beam.

"m" is a screw to secure the ferrule to the bow.

Fig. 5 is a view of the bow with the ferrule attached.

I do not claim the ferrule and washers separate, for they are used for different purposes; but What I do claim is—

The combination of the ferrule "c," or its equivalent, and the washers "e and f," for fastening ox bows as herein set forth.

HEMAN BANGS HAMMON.

Witnesses:
F. J. HAMMON,
OVID P. BARTON.